US012763581B2

(12) United States Patent
Ubben

(10) Patent No.: US 12,763,581 B2
(45) Date of Patent: Oct. 13, 2026

(54) SYSTEM AND METHOD FOR CONTROLLING A HARMONIC FILTER BANK OF A RENEWABLE ENERGY POWER SYSTEM

(71) Applicant: General Electric Renovables Espana, S.L., Barcelona (ES)

(72) Inventor: Enno Ubben, Steinfurt (DE)

(73) Assignee: GE Vernova Renovables Espana, S.L., Barcelona (ES)

( * ) Notice: Subject to any disclaimer, the term of this patent is extended or adjusted under 35 U.S.C. 154(b) by 311 days.

(21) Appl. No.: 18/692,012

(22) PCT Filed: Sep. 17, 2021

(86) PCT No.: PCT/IB2021/058504
§ 371 (c)(1),
(2) Date: Mar. 14, 2024

(87) PCT Pub. No.: WO2023/041959
PCT Pub. Date: Mar. 23, 2023

(65) Prior Publication Data
US 2024/0380213 A1 Nov. 14, 2024

(51) Int. Cl.
*H02J 3/38* (2026.01)
*H02J 3/01* (2006.01)
(Continued)

(52) U.S. Cl.
CPC .................. *H02J 3/38* (2013.01); *H02J 3/01* (2013.01); *H02J 2101/24* (2026.01); *H02J 2101/28* (2026.01)

(58) Field of Classification Search
USPC .......................................................... 700/287
See application file for complete search history.

(56) References Cited

U.S. PATENT DOCUMENTS 5,798,631 A * 8/1998 Spee ....................... F03D 7/046 322/29
6,670,721 B2 * 12/2003 Lof ......................... H02J 3/381 290/44

(Continued)

FOREIGN PATENT DOCUMENTS

EP 2424066 B1 10/2017

OTHER PUBLICATIONS

Andrew Jones, "Grid Connection of Renewable Energy", IEEE, 2010, p. 1-4. (Year: 2010).*

(Continued)

*Primary Examiner* — Hien D Khuu
(74) *Attorney, Agent, or Firm* — Dority & Manning, P.A.

(57) ABSTRACT

A method for controlling a renewable energy power system having at least one renewable energy asset connected to a power grid includes receiving, via a controller, at least one of an actual power output of the renewable energy power system or a number of the plurality of renewable energy assets that are online. Further, the method includes determining, via the controller, an actual number of active harmonic filter banks in operation based on at least one of the actual power output and the number of the plurality of renewable energy assets that are online. Moreover, the method includes adjusting or maintaining, via the controller, the actual number of active harmonic filter banks in operation to maintain steady state reactive power capabilities of the renewable energy power system to meet reactive power-active power curve requirements for the renewable energy power system.

20 Claims, 9 Drawing Sheets

(51) Int. Cl.
*H02J 101/24* (2026.01)
*H02J 101/28* (2026.01)

(56) References Cited

U.S. PATENT DOCUMENTS

| | | | | |
|---|---|---|---|---|
| 8,664,800 | B2 | 3/2014 | Galbraith et al. | |
| 8,847,562 | B2 | 9/2014 | Agudo Araque | |
| 11,736,056 | B2 * | 8/2023 | Jha | H02P 29/50 290/44 |
| 2003/0011348 | A1 * | 1/2003 | Lof | H02J 3/381 322/37 |
| 2005/0127680 | A1 * | 6/2005 | Lof | F03D 7/0284 290/44 |
| 2011/0309683 | A1 * | 12/2011 | Nielsen | H02J 3/16 307/84 |
| 2013/0253898 | A1 * | 9/2013 | Meagher | G06N 20/00 703/18 |
| 2014/0117948 | A1 * | 5/2014 | Yasugi | H02J 3/46 323/208 |
| 2018/0097450 | A1 * | 4/2018 | Andersson | H02M 7/25 |
| 2022/0216726 | A1 * | 7/2022 | Kamalasadan | H02J 9/062 |

OTHER PUBLICATIONS

Blasco-Gimenez, "LCC-HVDC Connection of Offshore Wind Farms With Reduced Filter Banks", IEEE, 2013, p. 2372-2380. (Year: 2013).*

PCT International Search Report & Written Opinion Corresponding to PCT/IB2021/058504 on May 20, 2022.

Niu et al., Robust Voltage Control Strategy for Hybrid AC/DC Sending-Side Systems to Prevent Cascading Trip Failures, XP011730667, IEEE Transactions on Sustainable Energy, vol. 10, No. 3, 2019, 1319-1329.

* cited by examiner

SYSTEM AND METHOD FOR CONTROLLING A HARMONIC FILTER BANK OF A RENEWABLE ENERGY POWER SYSTEM

RELATED APPLICATION

The present application claims priority to PCT Application Serial Number PCT/IB2021/058504, filed on Sep. 17, 2021, which is incorporated by reference herein.

FIELD

The present disclosure relates generally to electrical power systems and, more particularly, to a system and method for controlling a harmonic filter bank of a renewable energy power system to maintain steady state reactive power capabilities to meet PQ capability requirements for the renewable energy power system.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known airfoil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

More specifically, during operation of a wind turbine, wind impacts the rotor blades and the blades transform wind energy into a mechanical rotational torque that drives a low-speed shaft. The low-speed shaft drives the gearbox that subsequently steps up the low rotational speed of the low-speed shaft to drive a high-speed shaft at an increased rotational speed, wherein the high-speed shaft rotatably drives a generator rotor. In many conventional wind turbine configurations, the generator is electrically coupled to a bi-directional power converter that includes a rotor-side converter (RSC) joined to a line-side converter (LSC) via a regulated DC link. The LSC converts the DC power on the DC link into AC output power that is combined with the power from the generator stator to provide multi-phase power having a frequency maintained substantially at the frequency of the electrical grid bus (e.g., 50 HZ or 60 HZ). The above system is generally referred to as a doubly-fed induction generator (DFIG) system. Moreover, a plurality of wind turbines may be arranged together in a common geographical area known as a wind farm.

With the increasing penetration of wind turbines and/or wind farms, grid utilities require extended reactive power supply capability, not only during voltage dips, but also in steady-state operation. Wind turbines with DFIGs are able to control active and reactive power independently. The reactive power capability is subject to several limitations resulting from the voltage, current, and speed, which change with the operating point. In such systems, harmonic filter banks may be used to filter out higher frequency components into the transmission network. In addition, while enabled, these filter banks also provide a steady state reactive power output. At low or high active power output, however, this reactive power output can move the farm reactive power capability out of the required PQ (active power-reactive power) curve. FIG. 1 illustrates an example PQ curve 10 from a sample wind farm that includes a ratio of reactive power (e.g., Q) to rated power (e.g., $P_{rated}$) (y-axis) versus a ratio of active power (e.g., $P_{act}$) to rated power (e.g., $P_{rated}$) (x-axis). As shown, the PQ curve 10 includes three different scenarios 12, 14, 16 having slightly different PQ requirements, with a permissible range 18 of PQ operation also illustrated.

Thus, an improved system and method for controlling a harmonic filter bank of a renewable energy power system to maintain steady state reactive power capabilities to meet PQ capability requirements for the renewable energy power system would be welcomed in the technology.

BRIEF DESCRIPTION

Aspects and advantages of the invention will be set forth in part in the following description, or may be obvious from the description, or may be learned through practice of the invention.

In one aspect, the present disclosure is directed to a method for controlling a renewable energy power system having at least one renewable energy asset connected to a power grid. The method includes receiving, via a controller, at least one of an actual power output of the renewable energy power system or a number of the plurality of renewable energy assets that are online. Further, the method includes determining, via the controller, an actual number of active harmonic filter banks in operation based on at least one of the actual power output and the number of the plurality of renewable energy assets that are online. Moreover, the method includes adjusting or maintaining, via the controller, the actual number of active harmonic filter banks in operation to maintain steady state reactive power capabilities of the renewable energy power system to meet reactive power-active power curve requirements for the renewable energy power system.

In an embodiment, adjusting or maintaining the actual number of active harmonic filter banks in operation may include comparing a number of required active harmonic filter banks in operation with the actual number of active harmonic filter banks in operation and when the number of required active harmonic filter banks in operation is equal to the actual number of active harmonic filter banks in operation, maintaining the actual number of active harmonic filter banks in operation as-is.

In another embodiment, the method may include receiving, via the controller, a number of closed harmonic filter banks. In such embodiments, adjusting or maintaining the actual number of active harmonic filter banks in operation may include comparing a number of required active harmonic filter banks in operation with the actual number of active harmonic filter banks in operation and when the number of required active harmonic filter banks in operation is higher than the number of closed harmonic filter banks, generating a first pulse signal for the controller to close at least one additional harmonic filter bank to increase the actual number of active harmonic filter banks in operation.

In further embodiments, the method may include using at least one of one or more state feedbacks or one or more availability feedbacks from a reactive power bank controller to detect at least one of a pole disagreement between the first pulse signal and a state of the at least one additional harmonic filter bank or an availability status of each of a plurality of harmonic filter banks.

In certain embodiments, if the pole disagreement is detected, the method may include setting the state of the at least one additional harmonic filter bank to an unavailable state.

In additional embodiments, adjusting or maintaining the actual number of active harmonic filter banks in operation may include comparing a number of required active harmonic filter banks in operation with the actual number of active harmonic filter banks in operation and when the number of required active harmonic filter banks in operation is lower than the actual number of active harmonic filter banks in operation, generating a second pulse signal for the controller to trip at least one additional harmonic filter bank to increase the actual number of active harmonic filter banks in operation.

In an embodiment, the method includes using at least one of one or more state feedbacks or one or more availability feedbacks from a reactive power bank controller to detect at least one of a pole disagreement between the second pulse signal and a state of the at least one additional harmonic filter bank or an availability status of each of a plurality of harmonic filter banks. In such embodiments, if the pole disagreement is detected, the method may include setting the state of the at least one additional harmonic filter bank to an unavailable state.

In another embodiment, the renewable energy power system may be a wind turbine power system, an energy storage system, a solar power system, or combinations thereof. Thus, in such embodiments, the renewable energy asset(s) may be a wind turbine, a solar panel, an energy storage device, or combinations thereof.

In another aspect, the present disclosure is directed to a system for controlling a renewable energy power system having a plurality of renewable energy assets connected to a power grid. The system includes a controller configured to perform a plurality of operations, including but not limited to receiving an actual power output of the renewable energy power system, receiving, via the controller, a number of plurality of renewable energy assets that are online, determining an actual number of active harmonic filter banks in operation based on the actual power output and the number of the plurality of renewable energy assets that are online, and adjusting or maintaining the actual number of active harmonic filter banks in operation to maintain steady state reactive power capabilities of the renewable energy power system to meet reactive power-active power curve requirements for the renewable energy power system. It should be understood that the system may further include any combination of the additional features and/or steps as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
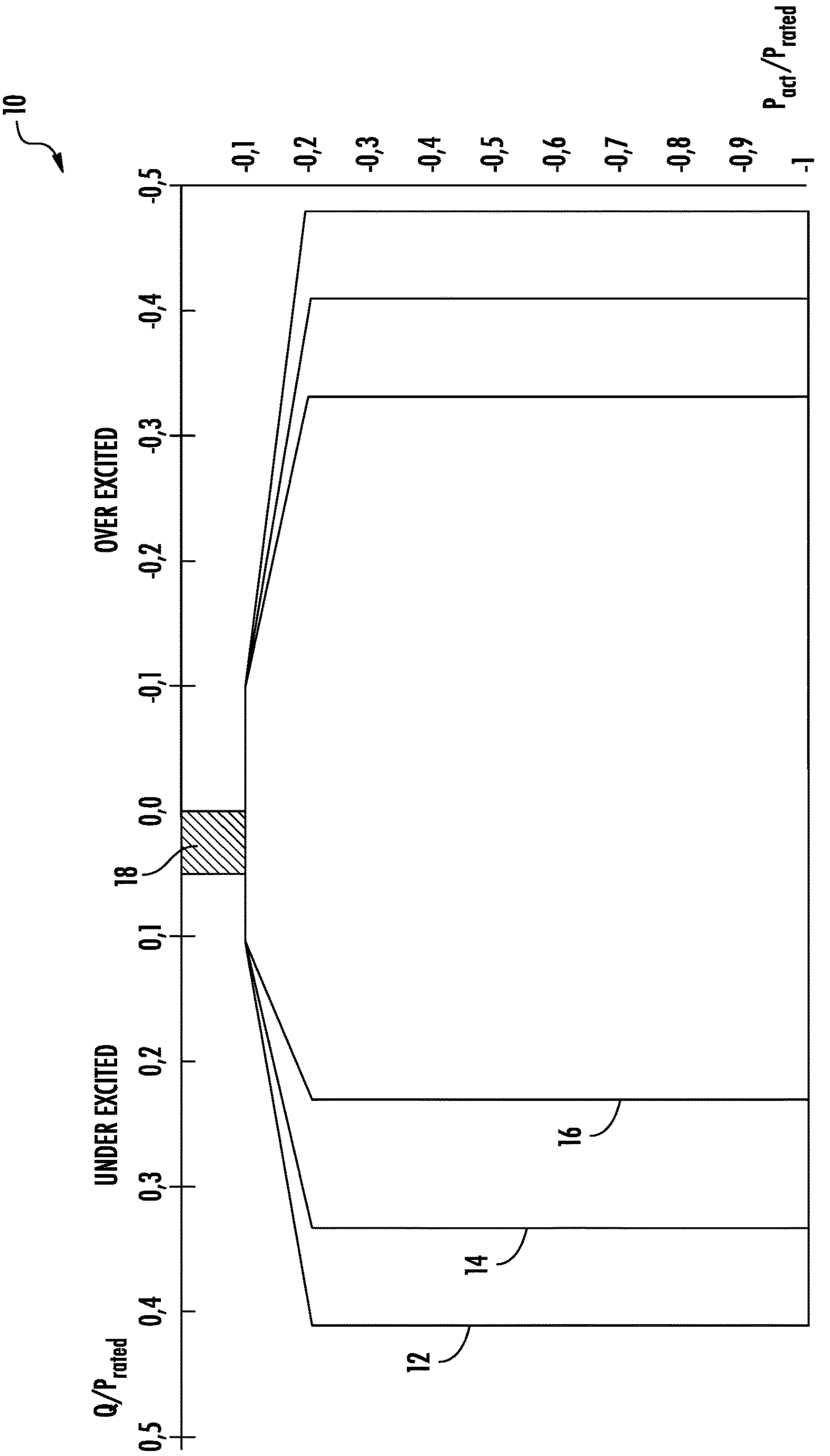
FIG. 1 illustrates a PQ curve of a wind farm that includes a ratio of reactive power to rated power (y-axis) versus a ratio of active power to rated power (x-axis) according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to systems and methods for controlling a renewable energy power system, such as a wind turbine power system, connected to a power grid. It should be understood that the present disclosure can also be used for DFIG systems, full conversion systems, battery/energy storage systems, and/or solar power systems. Thus, in such embodiments, the renewable energy asset(s) may be a wind turbine, a solar panel, an energy storage device, or combinations thereof.

More specifically, the present disclosure includes a control strategy to switch on/off the harmonic filter banks based on monitoring the number of wind turbines online, as the online wind turbines typically provide their rated reactive power capability. In case the wind turbines move to offline state, such turbines either have no reactive power capability or provide a reduced amount of reactive power capability (at least for DFIG generators). Having one or more wind turbines offline would require switching off one or more of the filter banks. For a setup of multiple filter banks (such as four filter banks), however, thresholds of the number of wind turbines online/offline can be defined to determine the number of banks in operation.

A similar approach to determine the number of active/online filter banks can be done based on the wind farm active power generation. For example, in an embodiment, below 10% of rated farm power, there are some relaxed requirements for the reactive power supply. In certain instances, wind farm operators may desire to reduce the amount of reactive power production to reduce collector losses. For such instances, active power thresholds can be defined to determine the number of active filter banks.

Accordingly, the present disclosure includes a method for determining the number of required filter banks, in which, such determination may be made by comparing the number of required filter banks in operation with the number of filter banks in operation. When the number is the same, no action is required. When the number of required filter banks is higher than the number of closed filter banks, then a pulse signal can be generated to close a filter bank. In the opposite way, if the number of required filter banks is lower than the number of filter banks in operation, then a second pulse signal can be generated to trip a filter bank.

Figure 2:
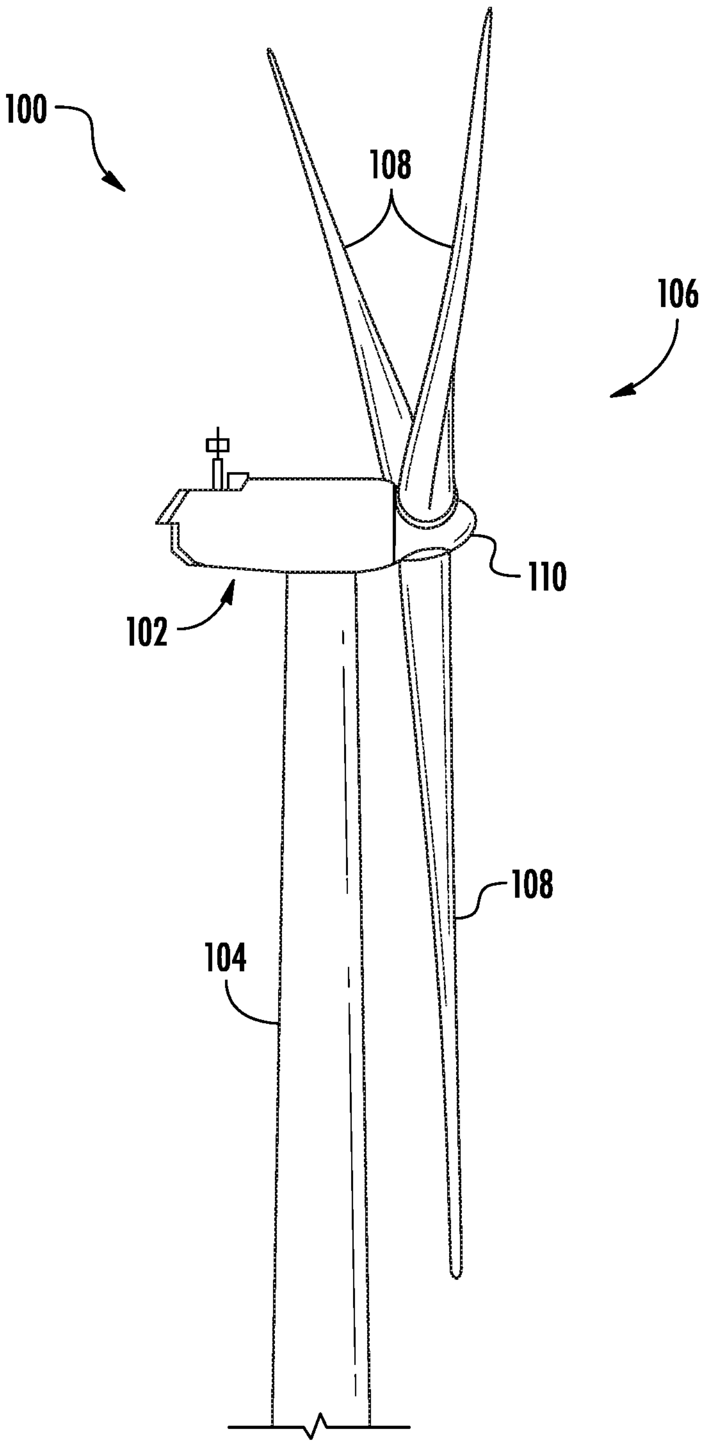
FIG. 2 illustrates a perspective view of one embodiment of a wind turbine according to the present disclosure.

Referring now to the drawings, FIG. 2 illustrates a schematic view of one embodiment of a wind turbine 100 according to the present disclosure. As shown, the wind turbine 100 includes a nacelle 102 housing a generator (not shown). The nacelle 102 may be mounted on a tower 104 (a portion of the tower 104 being shown in FIG. 2). The tower 104 may be any height that facilitates operation of wind turbine 100 as described herein. The wind turbine 100 also includes a rotor 106 that includes a plurality of rotor blades 108 attached to a rotating hub 110. More specifically, as shown, the wind turbine 100 includes three rotor blades 108 attached to the hub 110. Alternatively, the wind turbine 100 may include any number of rotor blades 108 that facilitate operation of the wind turbine 100 as described herein. In an embodiment, the wind turbine 100 may also include a gearbox 114 (FIG. 3) rotatably coupled to the rotor 106 and a generator 118 (FIG. 3).

Figure 3:
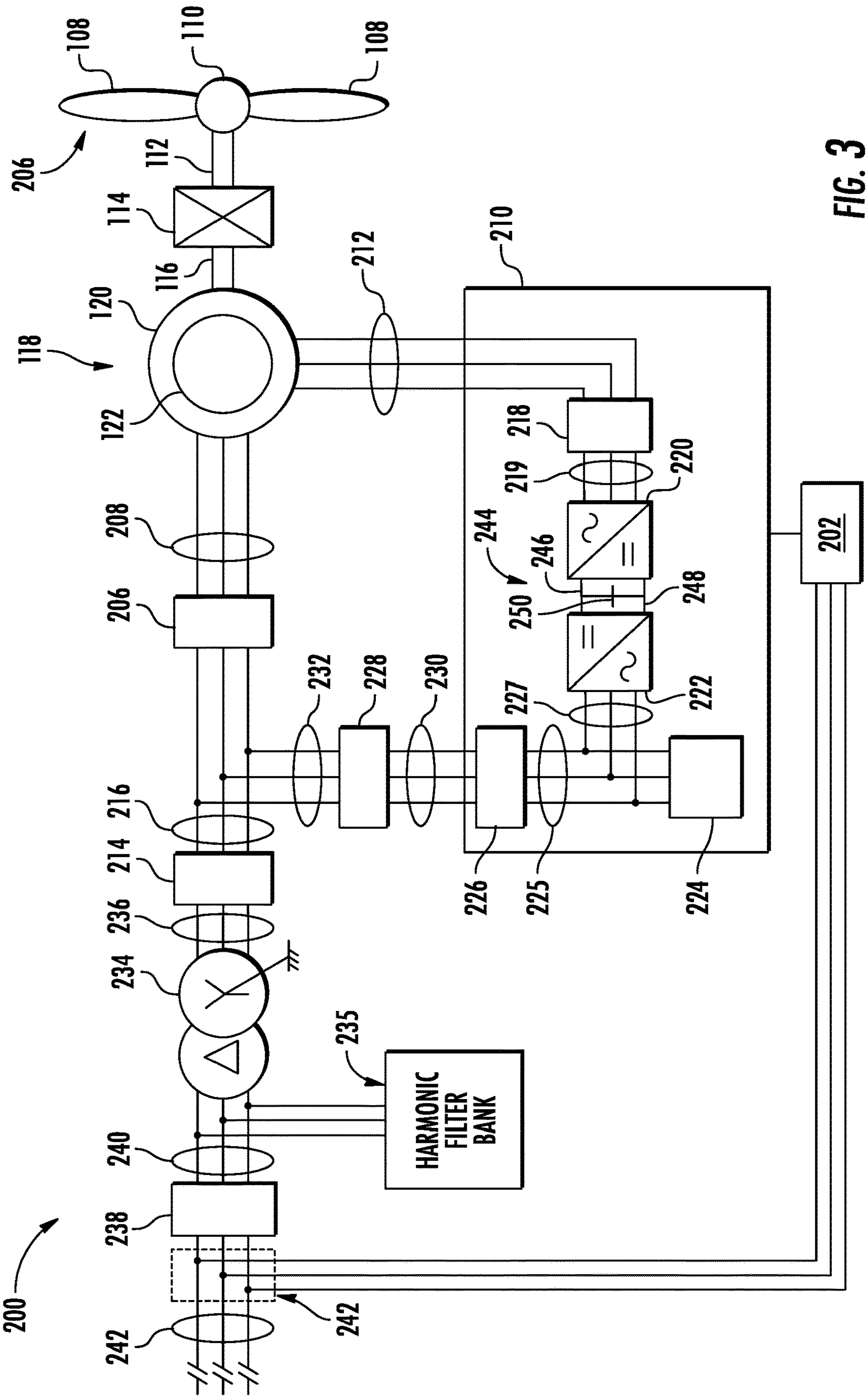
FIG. 3 illustrates a schematic view of one embodiment of an electrical and control system that may be used with the wind turbine shown in FIG. 2.

Referring particularly to FIG. 3, a schematic view of one embodiment of an electrical and control system 200 that may be used with the wind turbine 100 (shown in FIG. 1). As shown, the rotor 106 may be further rotatably coupled to a low-speed shaft 112. The low-speed shaft 112 may be coupled to a step-up gearbox 114. The gearbox 114 may be configured to step up the rotational speed of low-speed shaft 112 and transfer that speed to a high-speed shaft 116. In an embodiment, the gearbox 114 can have a step-up ratio of approximately 70:1. For example, the low-speed shaft 112 rotating at approximately 20 revolutions per minute (20) coupled to gearbox 114 with an approximately 70:1 step-up ratio generates the high-speed shaft 116 speed of approximately 1400 rpm. Alternatively, the gearbox 114 has any step-up ratio that facilitates operation of wind turbine 100 as described herein. Also, alternatively, the wind turbine 100 may include a direct-drive generator 118, wherein the generator 118 is rotatably coupled to the rotor 106 without any intervening gearbox.

The high-speed shaft 116 is rotatably coupled to the generator 118. In an embodiment, the generator 118 may be a wound rotor, synchronous, 60 Hz, three-phase, doubly-fed induction generator (DFIG) that includes a generator stator 120 magnetically coupled to a generator rotor 122. Alternatively, the generator 118 may any generator of any number of phases that facilitates operation of the wind turbine 100 as described herein.

Thus, during operation, wind impacts the rotor blades 108 and the rotor blades 108 transform mechanical wind energy into a mechanical rotational torque that rotatably drives the low-speed shaft 112 via the hub 110. The low-speed shaft 112 drives the gearbox 114 that subsequently steps up the low rotational speed of shaft 112 to drive the high-speed shaft 116 at an increased rotational speed. The high speed shaft 116 rotatably drives the generator rotor 122 such that a rotating magnetic field is induced within the generator rotor 122 and a voltage is induced within the generator stator 120 that is magnetically coupled to the generator rotor 122. The generator 118 converts the rotational mechanical energy to a sinusoidal, three-phase alternating current (AC) electrical energy signal in the generator stator 120.

The electrical and control system 200 may also include a controller 202. In an embodiment, the controller 202 may include a computer or other suitable processing unit. Thus, in several embodiments, the controller 202 may include suitable computer-readable instructions that, when implemented, configure the controller 202 to perform various different functions, such as receiving, transmitting and/or executing control signals. As such, the controller 202 may generally be configured to control the various operating modes (e.g., conducting or non-conducting states) of the one or more switches and/or components of embodiments of the electrical system 200.

As used herein, the term computer is not limited to just those integrated circuits referred to in the art as a computer, but broadly refers to a processor, a microcontroller, a microcomputer, a programmable logic controller (PLC), an application specific integrated circuit, and other programmable circuits, and these terms are used interchangeably herein. In the exemplary embodiment, memory may include, but is not limited to, a computer-readable medium, such as a random access memory (RAM). Alternatively, a floppy disk, a compact disc-read only memory (CD-ROM), a magneto-optical disk (MOD), and/or a digital versatile disc (DVD) may also be used. Also, in the exemplary embodiment, additional input channels may be, but not be limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Figure 4:
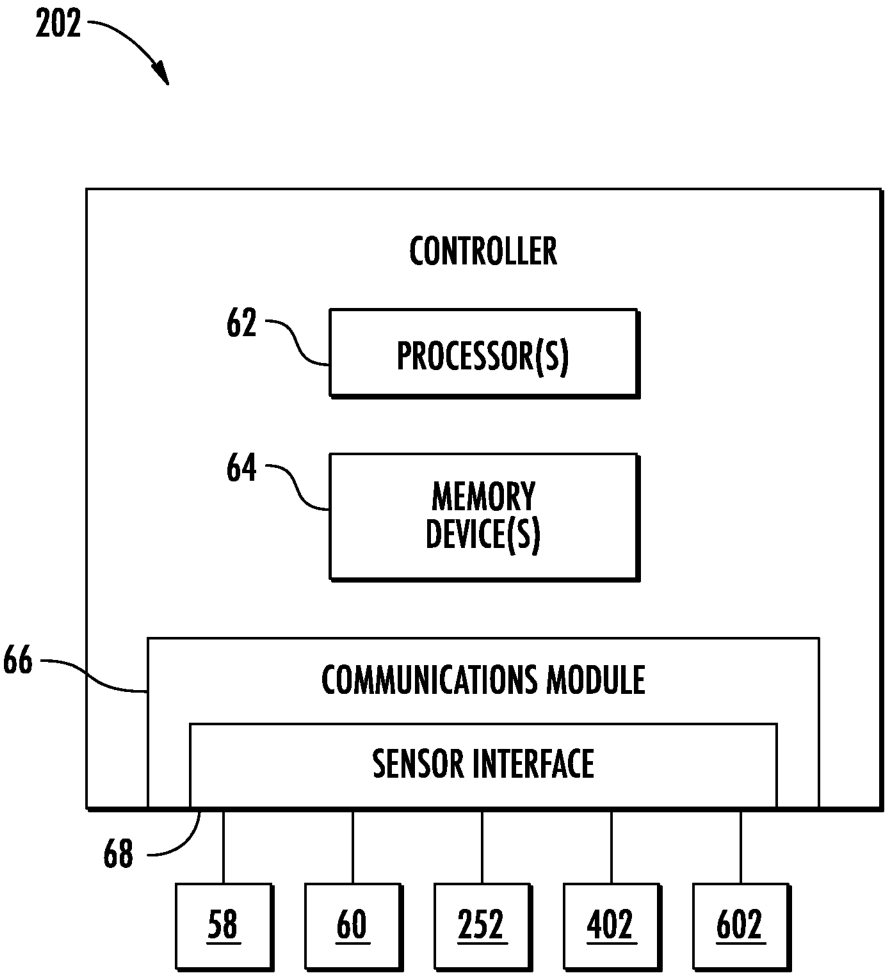
FIG. 4 illustrates a block diagram of one embodiment of suitable components that may be included within a controller of the wind turbine according to the present disclosure.

For example, FIG. 4 illustrates a block diagram of one embodiment of suitable components that may be included within an embodiment of a controller 202, or any other computing device in accordance with aspects of the present subject matter. As shown, the controller 202 may include one or more processor(s) 62 and associated memory device(s) 64 configured to perform a variety of computer-implemented functions (e.g., performing the methods, steps, calculations, and the like disclosed herein).

As used herein, the term “processor” refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 64 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 64 may generally be configured to store suitable computer-readable instructions that, when implemented by the processor(s) 62, configure the controller 202 to perform various functions including, but not limited to, directly or indirectly transmitting suitable control signals to one or more switches that comprise the bi-directional power conversion assembly 210, monitoring operating conditions of the electrical system 200, and various other suitable computer-implemented functions.

Additionally, the controller 202 may also include a communications module 66 to facilitate communications between the controller 202 and the various components of the electrical system 200. For instance, the communications module 66 may serve as an interface to permit the controller 202 to transmit control signals to any components of the wind turbine and electrical system 200. Moreover, the communications module 66 may include a sensor interface 68 (e.g., one or more analog-to-digital converters) to permit signals transmitted from the sensors (e.g., any of sensors 58, 60, 252, 402) to be converted into signals that can be understood and processed by the processors 62. Alternatively, the controller 202 may be provided with suitable computer readable instructions that, when implemented by its processor(s) 62, configure the controller 202 to take various actions depending upon the control mode of the wind turbine 100.

Referring back to FIG. 3, the generator stator 120 may be further electrically coupled to a stator synchronizing switch 206 via a stator bus 208. In the exemplary embodiment, to facilitate the DFIG configuration, the generator rotor 122 is electrically coupled to a bi-directional power conversion assembly 210 via a rotor bus 212. Alternatively, the system 200 may be configured as a full power conversion system, wherein a full power conversion assembly that is similar in design and operation to assembly 210 is electrically coupled to the stator 120 and such full power conversion assembly facilitates channeling electrical power between the stator 120 and an electric power transmission and distribution grid. The stator bus 208 transmits three-phase power from the stator 120 and the rotor bus 212 transmits three-phase power from the rotor 122 to the assembly 210. The stator synchronizing switch 206 is electrically coupled to a main transformer circuit breaker 214 via a system bus 216.

The power conversion assembly 210 includes a rotor filter 218 that is electrically coupled to the rotor 122 via the rotor bus 212. The rotor filter 218 is electrically coupled to a rotor-side, bi-directional power converter 220 via a rotor filter bus 219. The rotor-side converter 220 is electrically coupled to a line-side, bi-directional power converter 222. The converters 220 and 222 may substantially identical. The line-side converter 222 is electrically coupled to a line filter 224 and a line contactor 226 via a line-side power converter bus 223 and a line bus 225. In an embodiment, the converters 220 and 222 are configured in a three-phase, pulse width modulation (PWM) configuration including insulated gate bipolar transistor (IGBT) switching devices. Alternatively, the converters 220 and 222 may have any configuration using any switching devices that facilitate operation of the system 200 as described herein. Further, as shown, the assembly 210 is coupled in electronic data communication with the controller 202 to control the operation of the converters 220 and 222.

The line contactor 226 is electrically coupled to a conversion circuit breaker 228 via a conversion circuit breaker bus 230. The circuit breaker 228 is also electrically coupled to the system circuit breaker 214 via the system bus 216 and the connection bus 232. The system circuit breaker 214 is electrically coupled to an electric power main transformer 234 via a generator-side bus 236. The transformer 234 is electrically coupled to a grid circuit breaker 238 via a breaker-side bus 240. The grid breaker 238 is connected to an electric power transmission and distribution grid via a grid bus 242.

Still referring to FIG. 3, the RSC 220 and the LSC 222 are coupled in electrical communication with each other via a single direct current (DC) link 244. Alternatively, the RSC 220 and the LSC 222 may be electrically coupled via individual and separate DC links. The DC link 244 includes a positive rail 246, a negative rail 248, and at least one capacitor 250 coupled therebetween. Alternatively, the capacitor 250 may be one or more capacitors configured in series or in parallel between the rails 246 and 248.

In one embodiment, as shown, the system 200 may also include one or more voltage sensors 252 electrically coupled to each one of the three phases of the bus 242. Alternatively, the voltage sensors 252 may be electrically coupled to the system bus 216. Also, alternatively, the voltage sensors 252 may be electrically coupled to any portion of the system 200 that facilitates operation of the system 200 as described herein.

During operation, the associated electrical power from the generator 118 is transmitted to main transformer 234 via bus 208, switch 206, bus 216, breaker 214 and bus 236. The main transformer 234 steps up the voltage amplitude of the electrical power and the transformed electrical power is further transmitted to a grid via bus 240, circuit breaker 238 and bus 242.

In the doubly-fed induction generator configuration, a second electrical power transmission path is provided. For example, as shown, electrical, three-phase, sinusoidal, AC power is generated within wound the rotor 122 and is transmitted to the power conversion assembly 210 via the bus 212. Within the power conversion assembly 210, the electrical power is transmitted to the rotor filter 218, wherein the electrical power is modified for the rate of change of the PWM signals associated with the converter 220. The power converter 220 acts as a rectifier and rectifies the sinusoidal, three-phase AC power to DC power. The DC power is transmitted into the DC link 244. The capacitor 250 facilitates mitigating DC link voltage amplitude variations by facilitating mitigation of a DC ripple associated with AC rectification.

The DC power is subsequently transmitted from the DC link 244 to line-side converter 222, wherein the converter 222 acts as an inverter configured to convert the DC electrical power from the DC link 244 to three-phase, sinusoidal AC electrical power with pre-determined voltages, currents, and frequencies. This conversion is monitored and controlled via the controller 202. The converted AC power is transmitted from the line-side converter 222 to the bus 216 via buses 227 and 225, line contactor 226, bus 230, circuit breaker 228, and bus 232. The line filter 224 compensates or adjusts for harmonic currents in the electric power transmitted from the line-side converter 222. The stator synchronizing switch 206 is configured to close such that connecting the three-phase power from the stator 120 with the three-phase power from the assembly 210 is facilitated.

The circuit breakers 228, 214, and 238 are configured to disconnect corresponding buses, for example, when current flow is excessive and can damage the components of the system 200. Additional protection components are also provided, including line contactor 226, which may be controlled to form a disconnect by opening a switch (not shown in FIG. 2) corresponding to each of the lines of the line bus 230.

In addition, the power conversion assembly 210 may compensate or adjust the frequency of the three-phase power from the rotor 122 for changes, for example, in the wind speed at the hub 110 and the rotor blades 108. Therefore, in this manner, mechanical and electrical rotor frequencies are decoupled and the electrical stator and rotor frequency matching is facilitated substantially independently of the mechanical rotor speed.

Still referring to FIG. 3, the wind turbine power system 200 may also include a harmonic filter bank 235 for filtering out/removing higher frequency components into the transmission network. In addition, while enabled, the harmonic filter bank 235 also provides a steady state reactive power output for the wind turbine power system 200. For example, in an embodiment, the harmonic filter bank 235 may include one or more active filters for eliminating harmonics generated in the transmission network. In certain embodiments, for example, the active filter(s) may include a low-pass filter, a high-pass filter, a band-pass filter, a notch filter, or combinations thereof, as well as any other suitable filter. Moreover, in an embodiment, specific implementations of the filter(s) may be a lag filter, an exponential filter, a lead-lag compensator, a Kalman filter, or another other suitable implementation.

Figure 5:
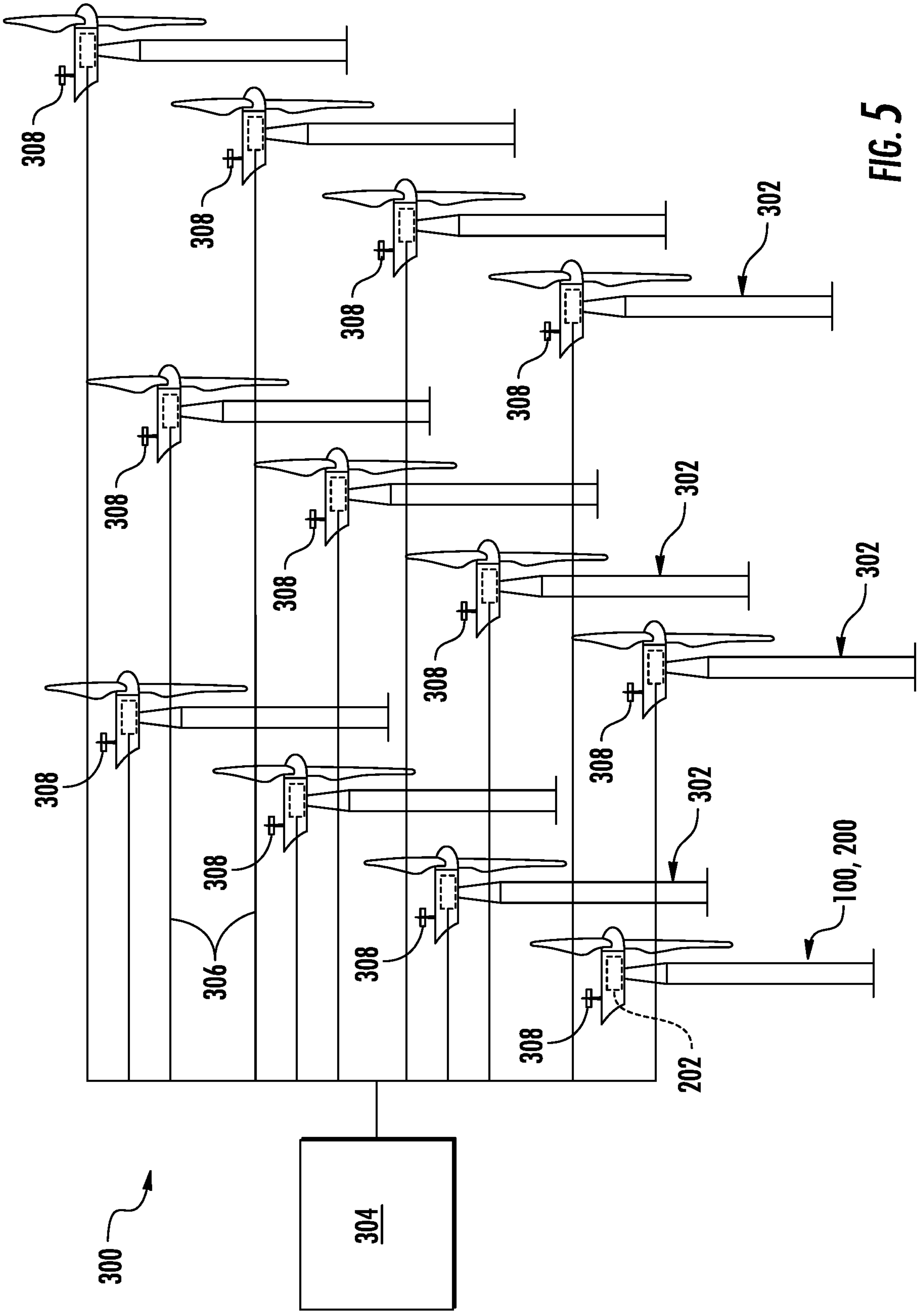
FIG. 5 illustrates a schematic diagram of one embodiment of a wind farm having a plurality of wind turbines according to the present disclosure.

Referring now to FIG. 5, as shown, the wind turbine 100 may be part of a wind farm 300 that includes a plurality of wind turbines 302 communicatively coupled to a farm controller 304 via a network 306. For example, as shown in the illustrated embodiment, the wind farm 300 includes twelve wind turbines, including wind turbine 100. However, in other embodiments, the wind farm 300 may include any other number of wind turbines, such as less than twelve wind turbines or greater than twelve wind turbines. In one embodiment, the controller 202 of the wind turbine 100 may be communicatively coupled to the farm controller 304 through a wired connection, such as by connecting the controller 202 through suitable communicative links (e.g., a suitable cable). Alternatively, the controller 202 may be communicatively coupled to the farm controller 304 through a wireless connection, such as by using any suitable wireless communications protocol known in the art. In addition, the farm controller 304 may be generally configured similar to the controllers 202 for each of the individual wind turbines 302 within the wind farm 300.

In several embodiments, one or more of the wind turbines 302 in the wind farm 300 may include a plurality of sensors for monitoring various operating data of the individual wind turbines 302 and/or one or more environmental parameters of the wind farm 300. For example, as shown, each of the wind turbines 302 may include a wind sensor 308, such as an anemometer or any other suitable device, configured for measuring wind speeds or any other wind parameter.

At low or high active power output, the reactive power output of the wind turbine power system 200 can move the farm reactive power capability out of the required PQ (active power-reactive power) curve. Thus, referring now to FIGS. 6 and 7, a method 400 and system 500 for controlling a harmonic filter bank of a renewable energy power system, such as the harmonic filter bank 235 of the wind turbine power system 200, to maintain steady state reactive power capabilities to meet PQ capability requirements for the renewable energy power system 200 is illustrated.

Figure 6:
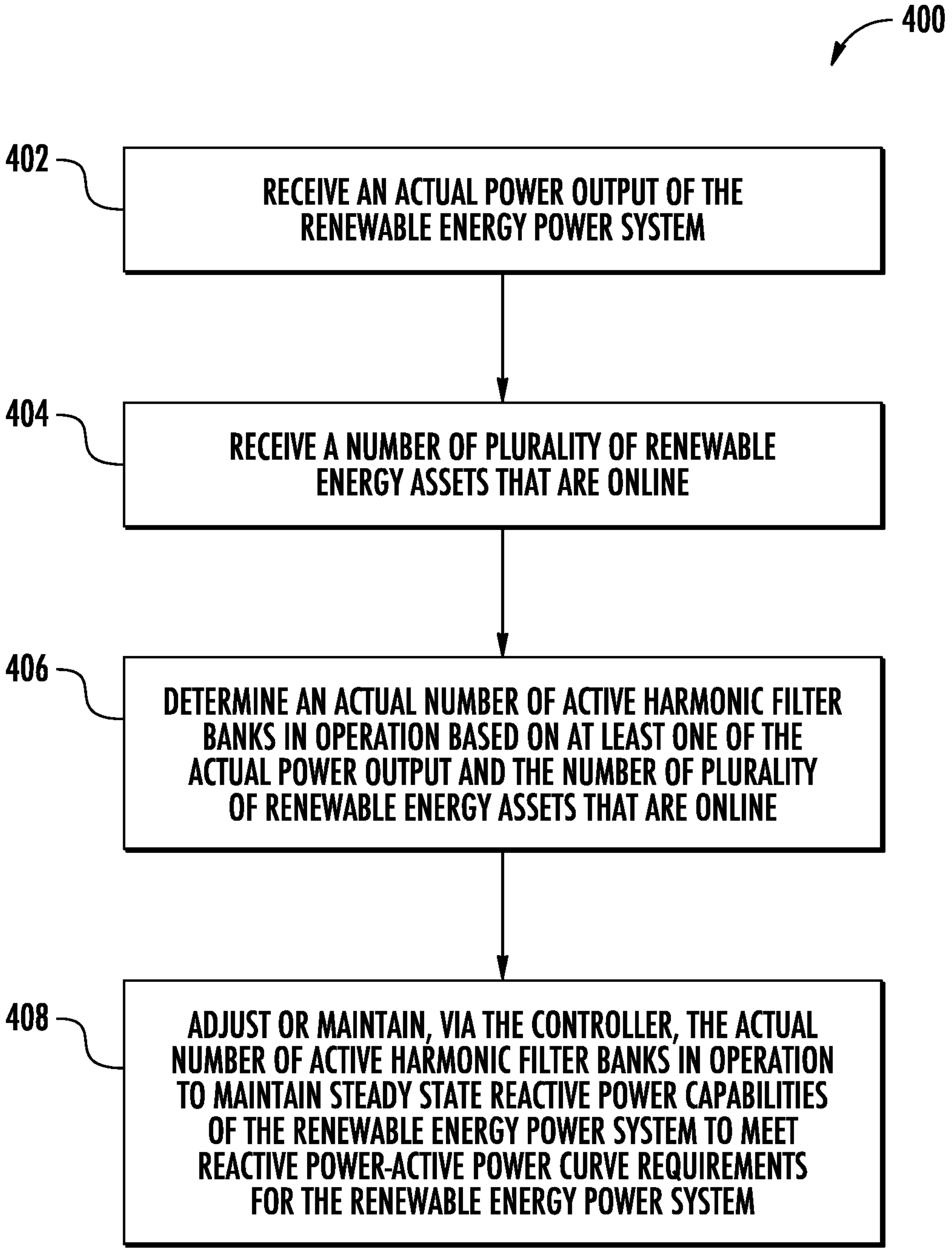
FIG. 6 illustrates a flow diagram of one embodiment of a method for controlling a renewable energy power system having at least one renewable energy asset connected to a power grid according to the present disclosure.

In particular, FIG. 6 illustrates a flow diagram of one embodiment of the method 400 for controlling a harmonic filter bank of a renewable energy power system. In general, the method 400 is described herein with reference to the wind turbine(s) 100, 302 of FIGS. 1-5. However, it should be appreciated that the disclosed method 400 may be implemented with wind turbines having any other suitable configurations. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (402), the method 400 includes receiving, via a controller, an actual power output of the renewable energy power system. As shown at (404), the method 400 includes receiving, via the controller, a number of plurality of renewable energy assets that are online. As shown at (406), the method 400 includes determining, via the controller, an actual number of active harmonic filter banks in operation based on the actual power output and the number of the plurality of renewable energy assets that are online. As shown at (408), the method 400 includes adjusting or maintaining, via the controller, the actual number of active harmonic filter banks in operation to maintain steady state reactive power capabilities of the renewable energy power system to meet reactive power-active power curve requirements for the renewable energy power system.

Figure 7:
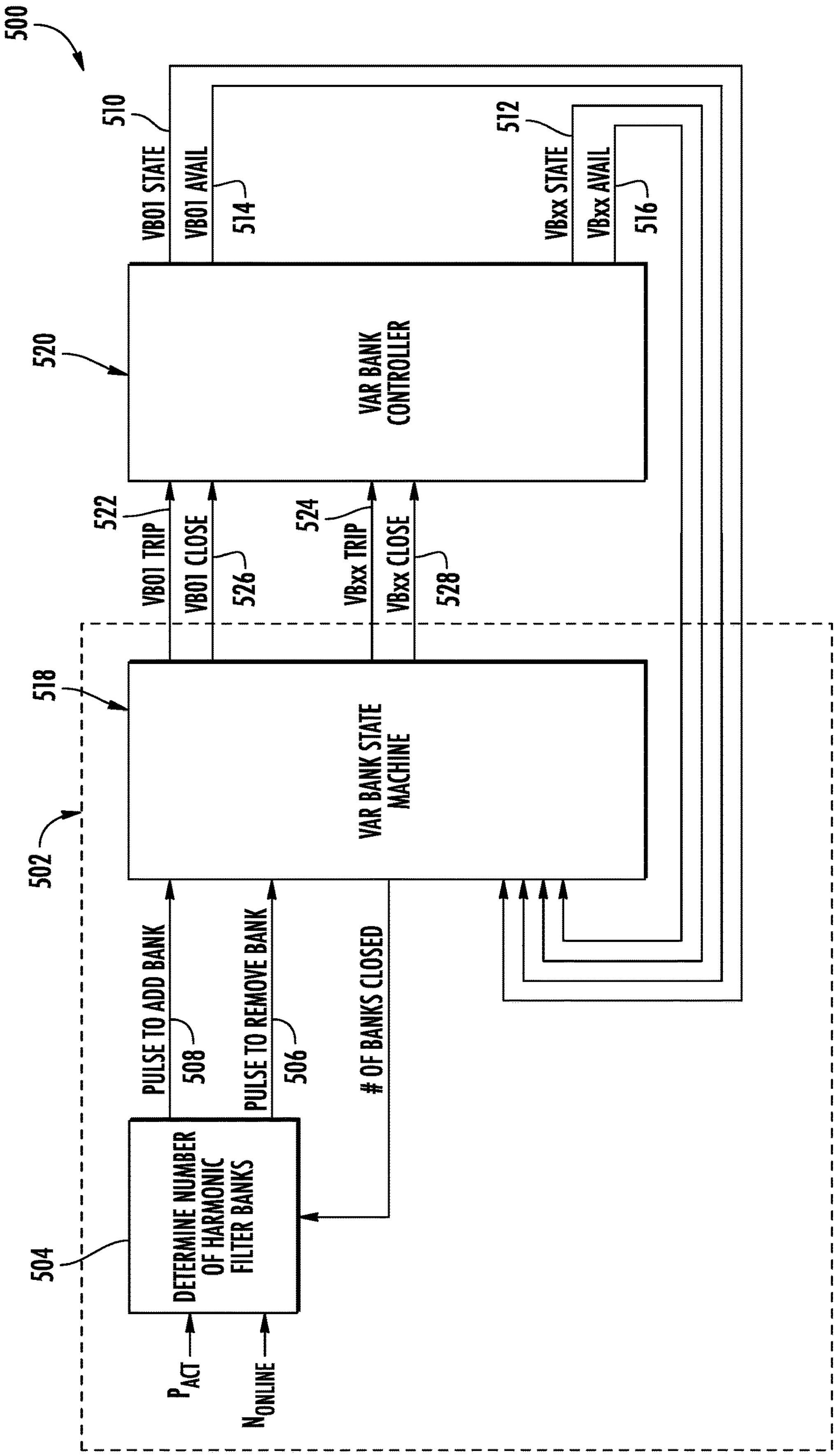
FIG. 7 illustrates a schematic diagram of one embodiment of a system for controlling a renewable energy power system having at least one renewable energy asset connected to a power grid according to the present disclosure.

The method 400 of FIG. 6 can be better understood with reference to the system 500 of FIG. 7. More particularly, as shown, the system 500 includes a controller 502, such as controller 202, a module 504, a VAR bank state machine 518, and a VAR bank controller 520. Thus, as shown, the controller 502 is configured to receive an actual power output (e.g., $P_{act}$) of the wind turbine power system 200 as well as a number of wind turbines 302 of the wind farm 300 that are online (e.g., $N_{online}$). In addition, as shown, the controller 502 is configured to receive a number of closed harmonic filter banks. Thus, in an embodiment, as shown via module 504, the controller 502 is configured to determine a number of harmonic filter banks.

Still referring to FIG. 7, as shown, the module 504 of the controller 502 is configured to adjust or maintain the actual number of active harmonic filter banks in operation by comparing a number of required active harmonic filter banks in operation with the actual number of active harmonic filter banks in operation. Thus, when the number of required active harmonic filter banks in operation is equal to the actual number of active harmonic filter banks in operation, the module 504 of the controller 502 is configured to maintain the actual number of active harmonic filter banks in operation as-is.

In another embodiment, when the number of required active harmonic filter banks in operation is higher than the number of closed harmonic filter banks, the module 504 of the controller 502 is configured to generate a first pulse signal 506 for the controller 502 to close at least one additional harmonic filter bank.

In additional embodiments, when the number of required active harmonic filter banks in operation is lower than the actual number of active harmonic filter banks in operation, the module 504 of the controller 502 is configured to generate a second pulse signal 508 for the controller 502 to trip at least one additional harmonic filter bank. Closing and tripping of the harmonic filter banks can be completed, for example, using the VAR bank state machine 518. In particular, as shown, the VAR bank state machine 518 is configured to generate various trip commands 522, 524 and/or close commands 526, 528 for instructing the various filter banks when to trip or close.

In general, the controller 502 uses one or more state feedbacks 510, 512 (e.g., filter bank closed/tripped/etc.) of the VAR bank controller 520. Thus, in an embodiment, the state feedback(s) 510, 512 can be used to detect some pole disagreement (e.g., in a case where a close command is sent, but the filter bank does not close). In certain embodiments, if the pole disagreement is detected, the controller 502 may be configured to set the state of the additional harmonic filter bank(s) to an unavailable state, so such filter banks are not used for any further operation. A reset by the operator is typically used to clear the pole disagreement fault.

Another optional manner for determining the available banks can be by using one or more availability feedbacks 514, 516 from the VAR/reactive power bank controller 520. In such embodiments, if a filter bank is unavailable, this filter bank can also be removed from operation.

Figure 8:
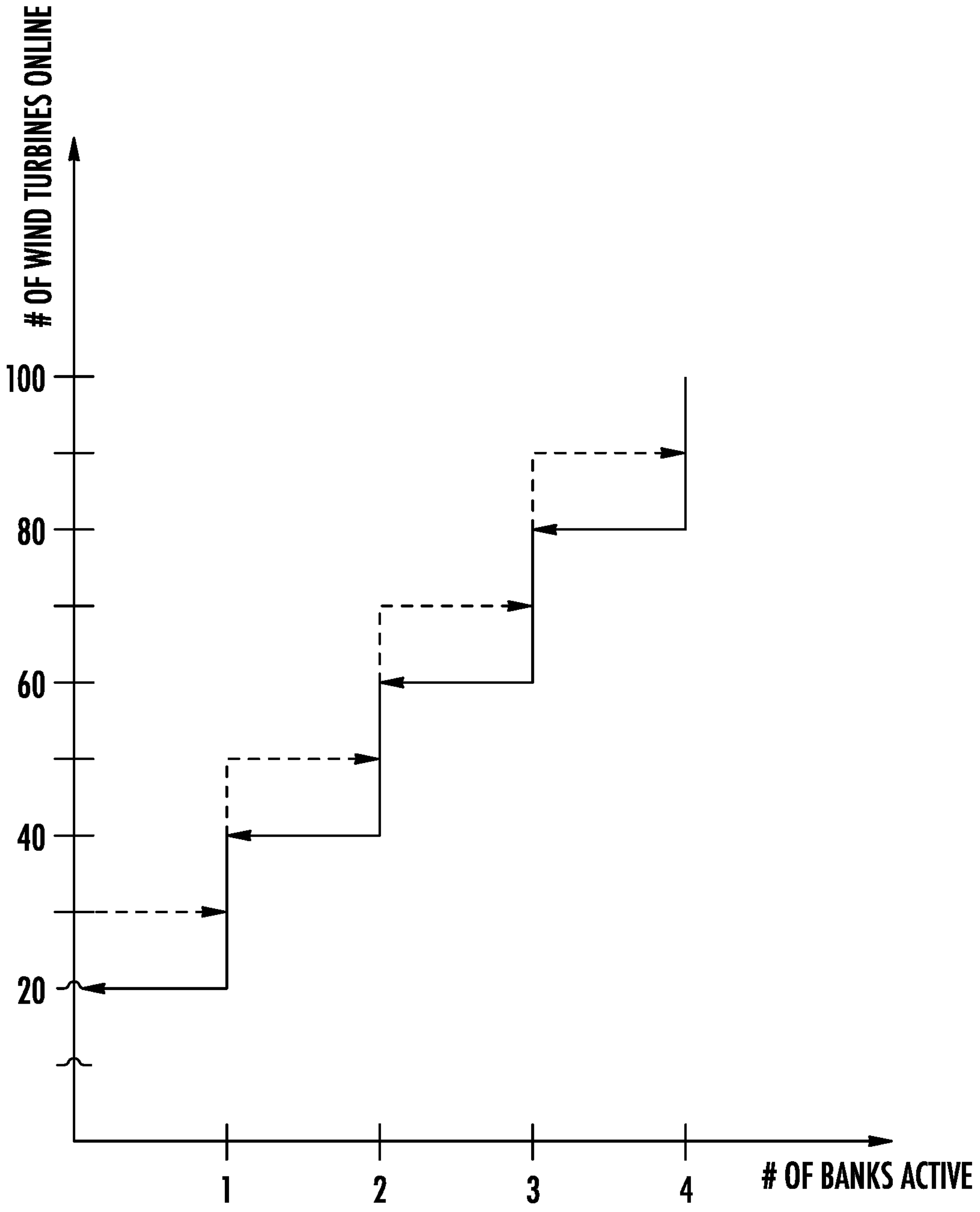
FIG. 8 illustrates a graph of the number of online wind turbines (y-axis) versus the number of active filter banks (x-axis) according to the present disclosure.
Figure 9:
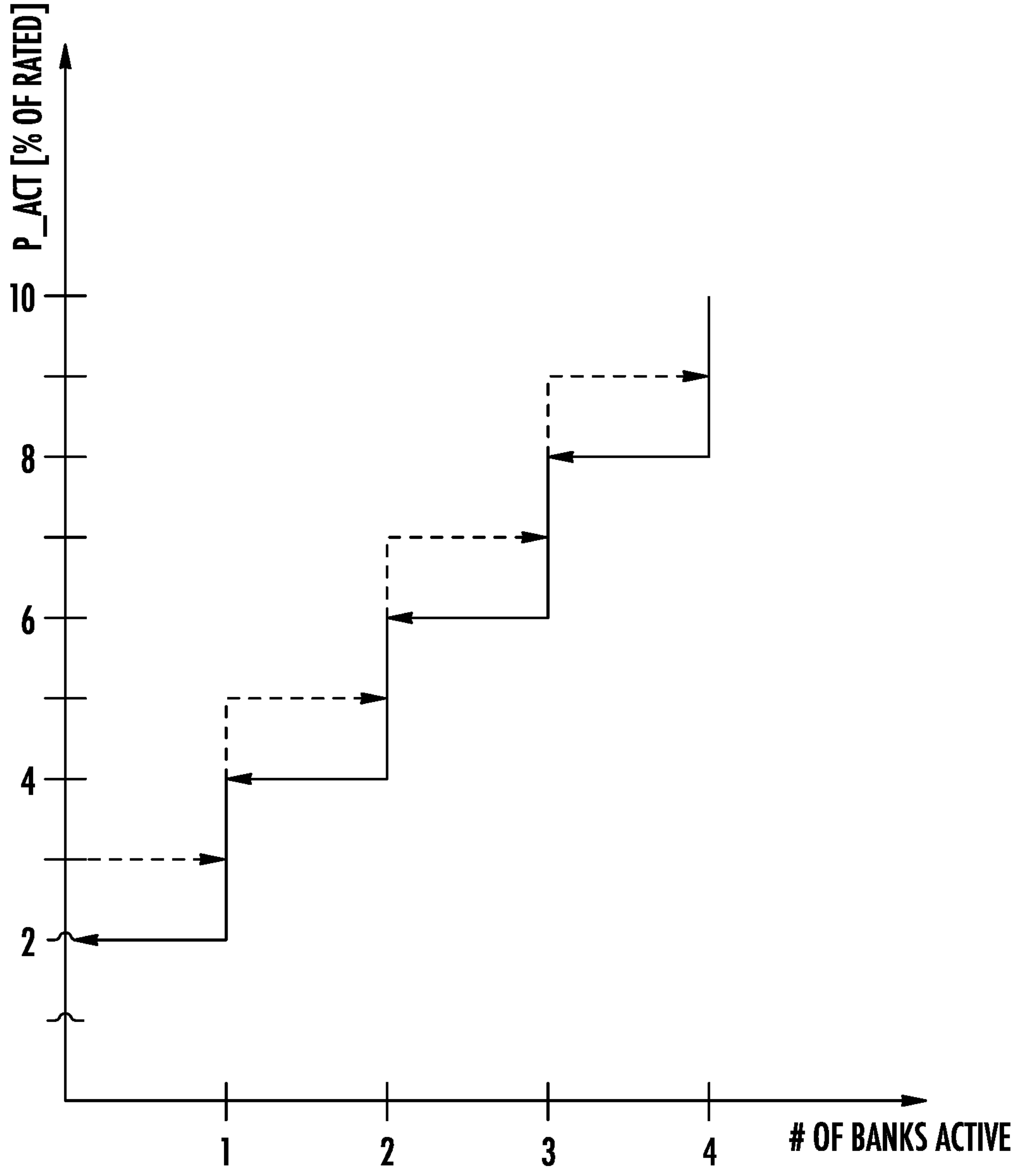
FIG. 9 illustrates a graph of the actual power output as a percentage of rated power (y-axis) versus the number of active filter banks (x-axis) according to the present disclosure.

Referring now to FIGS. 8 and 9, various graphs to illustrate the control logic of the present disclosure for determining the number of harmonic filter banks in operation are illustrated. For example, for the provided examples, a setup of multiple filter banks (such as four filter banks) is provided. Further, as shown in FIG. 8, various thresholds of the number of wind turbines online/offline can be defined to determine the number of banks in operation. Thus, as shown, the number of online wind turbines (y-axis) versus the number of active filter banks (x-axis) is provided according to the present disclosure. In such embodiments, for example, for one active filter bank, 30 wind turbines may be online, whereas for two filter banks, 50 wind turbines may be online, and so on. Thus, as shown in FIG. 8, as the number of online wind turbines increases, the number of active filter banks also increases and vice versa. It should be understood that any suitable thresholds for the number of wind turbines online/offline can be defined in addition to the example provided in FIG. 8. Further, a hysteresis (e.g., 10% of wind turbines) can also be used to avoid cyclic switching of the filter banks.

Similarly, as shown particularly in FIG. 9, a similar approach for determining the number of active filter banks can be accomplished based on the wind farm active power generation. For example, in an embodiment, below 10% of rated power, there are some relaxed requirements for the reactive power supply. Wind farm operators may even desire to reduce the amount of reactive power production to reduce their collector losses. For these scenarios, active power thresholds can be defined to determine the number of active filter banks. Thus, as shown in FIG. 9, the actual power output as a percentage of rated power (y-axis) versus the number of active filter banks (x-axis) is provided according to the present disclosure. Thus, as shown in FIG. 9, as the actual power output as a percentage of rated power increases, the number of active filter banks also increases and vice versa. For example, as shown, for one active filter bank, the power output may be equal to 3% of rated power, whereas for two filter banks, the power output may be equal to 5% of rated power, and so on.

As described above and as will be appreciated by one skilled in the art, embodiments of the present invention may be configured as a system, method, or a computer program product. Accordingly, embodiments of the present invention may be comprised of various means including entirely of hardware, entirely of software, or any combination of software and hardware. Furthermore, embodiments of the present invention may take the form of a computer program product on a computer-readable storage medium having computer-readable program instructions (e.g., computer software) embodied in the storage medium. Any suitable non-transitory computer-readable storage medium may be utilized including hard disks, CD-ROMs, optical storage devices, or magnetic storage devices.

Embodiments of the present invention have been described above with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a non-transitory computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Further aspects of the invention are provided by the subject matter of the following clauses:

Clause 1. A method for controlling a renewable energy power system having a plurality of renewable energy assets connected to a power grid, the method comprising:

receiving, via a controller, at least one of an actual power output of the renewable energy power system or a number of the plurality of renewable energy assets that are online:

determining, via the controller, an actual number of active harmonic filter banks in operation based on at least one of the actual power output and the number of the plurality of renewable energy assets that are online; and adjusting or maintaining, via the controller, the actual number of active harmonic filter banks in operation to maintain steady state reactive power capabilities of the renewable energy power system to meet reactive power-active power curve requirements for the renewable energy power system.

Clause 2. The method of clause 1, wherein adjusting or maintaining the actual number of active harmonic filter banks in operation further comprises:

comparing a number of required active harmonic filter banks in operation with the actual number of active harmonic filter banks in operation; and when the number of required active harmonic filter banks in operation is equal to the actual number of active harmonic filter banks in operation, maintaining the actual number of active harmonic filter banks in operation as-is.

Clause 3. The method of clauses 1-2, further comprising receiving, via the controller, a number of closed harmonic filter banks.

Clause 4. The method of clause 3, wherein adjusting or maintaining the actual number of active harmonic filter banks in operation further comprises: comparing a number of required active harmonic filter banks in operation with the actual number of active harmonic filter banks in operation: and when the number of required active harmonic filter banks in operation is higher than the number of closed harmonic filter banks, generating a first pulse signal for the controller to close at least one additional harmonic filter bank to increase the actual number of active harmonic filter banks in operation.

Clause 5. The method of clause 4, further comprising using at least one of one or more state feedbacks or one or more availability feedbacks from a reactive power bank controller to detect at least one of a pole disagreement between the first pulse signal and a state of the at least one additional harmonic filter bank or an availability status of each of a plurality of harmonic filter banks.

Clause 6. The method of clause 5, wherein, if the pole disagreement is detected, the method further comprises setting the state of the at least one additional harmonic filter bank to an unavailable state.

Clause 7. The method of any of the preceding clauses, wherein adjusting or maintaining the actual number of active harmonic filter banks in operation further comprises:

comparing a number of required active harmonic filter banks in operation with the actual number of active harmonic filter banks in operation: and when the number of required active harmonic filter banks in operation is lower than the actual number of active harmonic filter banks in operation, generating a second pulse signal for the controller to trip at least one additional harmonic filter bank to increase the actual number of active harmonic filter banks in operation.

Clause 8. The method of clause 7, further comprising using at least one of one or more state feedbacks or one or more availability feedbacks from a reactive power bank controller to detect at least one of a pole disagreement between the second pulse signal and a state of the at least one additional harmonic filter bank or an availability status of each of a plurality of harmonic filter banks.

Clause 9. The method of clause 8, wherein, if the pole disagreement is detected, the method further comprises setting the state of the at least one additional harmonic filter bank to an unavailable state.

Clause 10. The method of any of the preceding clauses, wherein the renewable energy power system comprises at least one of a wind turbine power system, an energy storage system, a solar power system, or combinations thereof, and wherein the plurality of renewable energy assets comprises at least one of a wind turbine, a solar panel, an energy storage device, or combinations thereof.

Clause 11. A system for controlling a renewable energy power system having a plurality of renewable energy assets connected to a power grid, the system comprising:

a controller configured to perform a plurality of operations, the plurality of operations comprising:

receiving at least one of an actual power output of the renewable energy power system or a number of the plurality of renewable energy assets that are online:

determining an actual number of active harmonic filter banks in operation based on at least one of the actual power output and the number of the plurality of renewable energy assets that are online; and adjusting or maintaining the actual number of active harmonic filter banks in operation to maintain steady state reactive power capabilities of the renewable energy power system to meet reactive power-active power curve requirements for the renewable energy power system.

Clause 12. The system of clause 11, wherein adjusting or maintaining the actual number of active harmonic filter banks in operation further comprises:

comparing a number of required active harmonic filter banks in operation with the actual number of active harmonic filter banks in operation: and when the number of required active harmonic filter banks in operation is equal to the actual number of active harmonic filter banks in operation, maintaining the actual number of active harmonic filter banks in operation as-is.

Clause 13. The system of clauses 11-12, wherein the plurality of operations further comprise receiving, via the controller, a number of closed harmonic filter banks.

Clause 14. The system of clause 13, wherein adjusting or maintaining the actual number of active harmonic filter banks in operation further comprises:

comparing a number of required active harmonic filter banks in operation with the actual number of active harmonic filter banks in operation: and when the number of required active harmonic filter banks in operation is higher than the number of closed harmonic filter banks, generating a first pulse signal for the controller to close at least one additional harmonic filter bank to increase the actual number of active harmonic filter banks in operation.

Clause 15. The system of clause 14, wherein the plurality of operations further comprise using at least one of one or more state feedbacks or one or more availability feedbacks from a reactive power bank controller to detect at least one of a pole disagreement between the first pulse signal and a state of the at least one additional harmonic filter bank or an availability status of each of a plurality of harmonic filter banks.

Clause 16. The system of clause 15, wherein, if the pole disagreement is detected, the system further comprises setting the state of the at least one additional harmonic filter bank to an unavailable state.

Clause 17. The system of clauses 11-16, wherein adjusting or maintaining the actual number of active harmonic filter banks in operation further comprises: comparing a number of required active harmonic filter banks in operation with the actual number of active harmonic filter banks in operation: and when the number of required active harmonic filter banks in operation is lower than the actual number of active harmonic filter banks in operation, generating a second pulse signal for the controller to trip at least one additional harmonic filter bank to increase the actual number of active harmonic filter banks in operation.

Clause 18. The system of clause 17, wherein the plurality of operations further comprise using at least one of one or more state feedbacks or one or more availability feedbacks from a reactive power bank controller to detect at least one of a pole disagreement between the second pulse signal and a state of the at least one additional harmonic filter bank or an availability status of each of a plurality of harmonic filter banks.

Clause 19. The system of clause 18, wherein, if the pole disagreement is detected, the system further comprises setting the state of the at least one additional harmonic filter bank to an unavailable state.

Clause 20. The system of clauses 11-19, wherein the renewable energy power system comprises at least one of a wind turbine power system, an energy storage system, a solar power system, or combinations thereof, and wherein the at least one renewable energy asset comprises at least one of a wind turbine, a solar panel, an energy storage device, or combinations thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling a renewable energy power system having a plurality of renewable energy assets connected to a power grid, the method comprising:

receiving, via a controller, at least one of an actual power output of the renewable energy power system or a number of the plurality of renewable energy assets that are online;

determining, via the controller, an actual number of active harmonic filter banks in operation based on at least one of the actual power output of the renewable energy power system or the number of the plurality of renewable energy assets that are online; and adjusting or maintaining, via the controller, the actual number of active harmonic filter banks in operation to maintain steady state reactive power capabilities of the renewable energy power system to meet reactive power-active power curve requirements for the renewable energy power system, wherein adjusting or maintaining the actual number of active harmonic filter banks in operation further comprises:

comparing a number of required active harmonic filter banks in operation with the actual number of active harmonic filter banks in operation; and in response to the number of required active harmonic filter banks in operation is equal to the actual number of active harmonic filter banks in operation, maintaining the actual number of active harmonic filter banks in operation as-is.

2. The method of claim 1, further comprising receiving, via the controller, a number of closed harmonic filter banks.

3. The method of claim 2, wherein adjusting or maintaining the actual number of active harmonic filter banks in operation further comprises: comparing a number of required active harmonic filter banks in operation with the actual number of active harmonic filter banks in operation; and in response to the number of required active harmonic filter banks in operation is higher than the number of closed harmonic filter banks, generating a first pulse signal for the controller to close at least one additional harmonic filter bank to increase the actual number of active harmonic filter banks in operation.

4. The method of claim 3, further comprising using at least one of one or more state feedbacks or one or more availability feedbacks from a reactive power bank controller to detect at least one of a pole disagreement between the first pulse signal and a state of the at least one additional harmonic filter bank or an availability status of each of a plurality of harmonic filter banks.

5. The method of claim 4, wherein, if the pole disagreement is detected, the method further comprises setting the state of the at least one additional harmonic filter bank to an unavailable state.

6. The method of claim 1, wherein adjusting or maintaining the actual number of active harmonic filter banks in operation further comprises: comparing a number of required active harmonic filter banks in operation with the actual number of active harmonic filter banks in operation; and in response to the number of required active harmonic filter banks in operation is lower than the actual number of active harmonic filter banks in operation, generating a second pulse signal for the controller to trip at least one additional harmonic filter bank to increase the actual number of active harmonic filter banks in operation.

7. The method of claim 6, further comprising using at least one of one or more state feedbacks or one or more availability feedbacks from a reactive power bank controller to detect at least one of a pole disagreement between the second pulse signal and a state of the at least one additional harmonic filter bank or an availability status of each of a plurality of harmonic filter banks.

8. The method of claim 7, wherein, if the pole disagreement is detected, the method further comprises setting the state of the at least one additional harmonic filter bank to an unavailable state.

9. The method of claim 1, wherein the renewable energy power system comprises at least one of a wind turbine power system, an energy storage system, a solar power system, or combinations thereof, and wherein the plurality of renewable energy assets comprises at least one of a wind turbine, a solar panel, an energy storage device, or combinations thereof.

10. A system for controlling a renewable energy power system having a plurality of renewable energy assets connected to a power grid, the system comprising:

a controller configured to perform a plurality of operations, the plurality of operations comprising:

receiving at least one of an actual power output of the renewable energy power system or a number of the plurality of renewable energy assets that are online;

determining an actual number of active harmonic filter banks in operation based on at least one of the actual power output of the renewable energy power system or the number of the plurality of renewable energy assets that are online; and adjusting or maintaining the actual number of active harmonic filter banks in operation to maintain steady state reactive power capabilities of the renewable energy power system to meet reactive power-active power curve requirements for the renewable energy power system, wherein adjusting or maintaining the actual number of active harmonic filter banks in operation further comprises:

comparing a number of required active harmonic filter banks in operation with the actual number of active harmonic filter banks in operation; and in response to the number of required active harmonic filter banks in operation is lower than the actual number of active harmonic filter banks in operation, generating a second pulse signal for the controller to trip at least one additional harmonic filter bank to increase the actual number of active harmonic filter banks in operation.

11. The system of claim 10, wherein adjusting or maintaining the actual number of active harmonic filter banks in operation further comprises: comparing a number of required active harmonic filter banks in operation with the actual number of active harmonic filter banks in operation; and in response to the number of required active harmonic filter banks in operation is equal to the actual number of active harmonic filter banks in operation, maintaining the actual number of active harmonic filter banks in operation as-is.

12. The system of claim 10, wherein the plurality of operations further comprise receiving, via the controller, a number of closed harmonic filter banks.

13. The system of claim 12, wherein adjusting or maintaining the actual number of active harmonic filter banks in operation further comprises: comparing a number of required active harmonic filter banks in operation with the actual number of active harmonic filter banks in operation; and in response to the number of required active harmonic filter banks in operation is higher than the number of closed harmonic filter banks, generating a first pulse signal for the controller to close at least one additional harmonic filter bank to increase the actual number of active harmonic filter banks in operation.

14. The system of claim 13, wherein the plurality of operations further comprise using at least one of one or more state feedbacks or one or more availability feedbacks from a reactive power bank controller to detect at least one of a pole disagreement between the first pulse signal and a state of the at least one additional harmonic filter bank or an availability status of each of a plurality of harmonic filter banks.

15. The system of claim 14, wherein, if the pole disagreement is detected, the system further comprises setting the state of the at least one additional harmonic filter bank to an unavailable state.

16. The system of claim 10, wherein the plurality of operations further comprise using at least one of one or more state feedbacks or one or more availability feedbacks from a reactive power bank controller to detect at least one of a pole disagreement between the second pulse signal and a state of the at least one additional harmonic filter bank or an availability status of each of a plurality of harmonic filter banks.

17. The system of claim 16, wherein, if the pole disagreement is detected, the system further comprises setting the state of the at least one additional harmonic filter bank to an unavailable state.

18. The system of claim 10, wherein the renewable energy power system comprises at least one of a wind turbine power system, an energy storage system, a solar power system, or combinations thereof, and wherein the at least one renewable energy asset comprises at least one of a wind turbine, a solar panel, an energy storage device, or combinations thereof.

19. A system for controlling a renewable energy power system having a plurality of renewable energy assets connected to a power grid, the system comprising:

a controller configured to perform a plurality of operations, the plurality of operations comprising:

receiving at least one of an actual power output of the renewable energy power system or a number of the plurality of renewable energy assets that are online;

determining an actual number of active harmonic filter banks in operation based on at least one of the actual power output of the renewable energy power system or the number of the plurality of renewable energy assets that are online;

receiving, via the controller, a number of closed harmonic filter banks; and adjusting or maintaining the actual number of active harmonic filter banks in operation to maintain steady state reactive power capabilities of the renewable energy power system to meet reactive power-active power curve requirements for the renewable energy power system, wherein adjusting or maintaining the actual number of active harmonic filter banks in operation further comprises:

comparing a number of required active harmonic filter banks in operation with the actual number of active harmonic filter banks in operation; and in response to the number of required active harmonic filter banks in operation is higher than the number of closed harmonic filter banks, generating a first pulse signal for the controller to close at least one additional harmonic filter bank to increase the actual number of active harmonic filter banks in operation.

20. The system of claim 19, wherein adjusting or maintaining the actual number of active harmonic filter banks in operation further comprises: comparing a number of required active harmonic filter banks in operation with the actual number of active harmonic filter banks in operation; and in response to the number of required active harmonic filter banks in operation is equal to the actual number of active harmonic filter banks in operation, maintaining the actual number of active harmonic filter banks in operation as-is.

* * * * *